United States Patent
Andersson et al.

(10) Patent No.: US 12,250,413 B2
(45) Date of Patent: *Mar. 11, 2025

(54) DEBLOCKING BETWEEN BLOCK BOUNDARIES AND SUB-BLOCK BOUNDARIES IN A VIDEO ENCODER AND/OR VIDEO DECODER

(71) Applicant: Telefonaktiebolaget LM Ericsson (publ), Stockholm (SE)

(72) Inventors: Kenneth Andersson, Gävle (SE); Rickard Sjöberg, Stockholm (SE); Zhi Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,667

(22) Filed: Jun. 17, 2022

(65) Prior Publication Data
US 2022/0329875 A1    Oct. 13, 2022

Related U.S. Application Data

(63) Continuation of application No. 16/638,650, filed as application No. PCT/EP2019/079468 on Oct. 29, 2019, now Pat. No. 11,381,845.

(Continued)

(51) Int. Cl.
*H04N 19/105* (2014.01)
*H04N 19/176* (2014.01)
(Continued)

(52) U.S. Cl.
CPC ........... *H04N 19/86* (2014.11); *H04N 19/105* (2014.11); *H04N 19/176* (2014.11); *H04N 19/80* (2014.11)

(58) Field of Classification Search
CPC .... H04N 19/105; H04N 19/176; H04N 19/80; H04N 19/86
See application file for complete search history.

(56) References Cited

U.S. PATENT DOCUMENTS

| 7,539,248 B2 * | 5/2009 | Kwon ................ H04N 19/176 |
|  |  | 375/240.24 |
| 11,057,624 B2 | 7/2021 | Moon |

(Continued)

FOREIGN PATENT DOCUMENTS

| JP | 2008529411 A | 7/2008 |
| JP | 2021534637 A | 12/2021 |
| WO | 2019137750 | 7/2019 |

OTHER PUBLICATIONS

International Search Report and Written Opinion issued in International Application No. PCT/EP2019/079468 dated Feb. 10, 2020 (16 pages).

(Continued)

*Primary Examiner* — Jessica M Prince
(74) *Attorney, Agent, or Firm* — Rothwell, Figg, Ernst & Manbeck, P.C.

(57) ABSTRACT

A deblocking the method. The method includes deblocking a block boundary between a first block (B1) and a second block (B2) with the restriction that not more than 5 samples are modified on the B2 side of the block boundary as a result of the deblocking. The deblocking method also includes deblocking a sub-block boundary within the B2 block such that not more than 2 samples on the side of the sub-block boundary within the B2 block that is closest to the block boundary between B1 and B2 are modified by the deblocking.

19 Claims, 12 Drawing Sheets

Related U.S. Application Data

(60) Provisional application No. 62/752,789, filed on Oct. 30, 2018.

(51) Int. Cl.
*H04N 19/80* (2014.01)
*H04N 19/86* (2014.01)

(56) References Cited

U.S. PATENT DOCUMENTS

| | | | | |
|---|---|---|---|---|
| 2006/0165181 | A1* | 7/2006 | Kwan | H04N 19/176 |
| | | | | 375/E7.176 |
| 2013/0034169 | A1 | 2/2013 | Sadafale | |
| 2020/0382775 | A1* | 12/2020 | Kotra | H04N 19/117 |
| 2021/0344934 | A1* | 11/2021 | Tsai | H04N 19/184 |

OTHER PUBLICATIONS

Ikeda, M. et al., "CE11.1.6, CE11.1.7 and CE11.1.8: Joint proposals for long deblocking from Sony, Qualcomm, Sharp, Ericsson", Joint Video Experts Team (JVET) of ITU-T SG 16 WP 3 and ISO/IEC JTC 1/SC 29/WG 11, Document: JVET-M0471, 13th Meeting: Marrakesh, MA, Jan. 9-18, 2019 (11 pages).

Van Der Auwera, G. et al., "CE6.b: Report on SDIP Harmonization with Deblocking, MDIS, MDCS, and HE Residual Coding", Joint Collaborative Team on Video Coding (JCT-VC) of ITU-T SG16 WP3 and ISO/IEC JTC1/SC29/WG11, Document: JCTVC-F556, 6th Meeting: Torino, Jul. 14-22, 2011 (15 pages).

Andersson, K. et al., "CE2-2.1.1: Long deblocking filters and fixes", Joint Video Experts Team (JVET) of ITU-T SG 16 WP 3 and ISO/IEC JTC 1/SC 29/WG 11, Document: JVET-K0307-v1, 11th Meeting: Ljubljana, SI, Jul. 10-18, 2018 (6 pages).

Sun, X. et al., "Accelerating IEEE 1857 Deblocking Filter on GPU Using CUDA", 2015 IEEE International Conference on Multimedia Big Data, Apr. 20, 2015 (5 pages).

Bross, B. et al., "Versatile Video Coding (Draft 3)", Joint Video Experts Team (JVET) of ITU-T SG 16 WP 3 and ISO/IEC JTC 1/SC 29/WG 11, Document: JVET-L1001-v9, 12th Meeting: Macao, CN, Oct. 3-12, 2018 (233 pages).

Norkin, A. et al., "Description of Core Experiment 11 (CE11): Deblocking", Joint Video Experts Team (JVET) of ITU-T SG 16 WP 3 and ISO/IEC JTC 1/SC 29/WG 11, Document: JVET-L1031-v3, 12th Meeting: Macao, CN, Oct. 3-12, 2018 (19 pages).

* cited by examiner

DEBLOCKING BETWEEN BLOCK BOUNDARIES AND SUB-BLOCK BOUNDARIES IN A VIDEO ENCODER AND/OR VIDEO DECODER

CROSS-REFERENCE TO RELATED APPLICATIONS

This application is a continuation of U.S. application Ser. No. 16/638,650, filed on Feb. 12, 2020 (status Pending), which is a 35 U.S.C. § 371 National Stage of International Patent Application No. PCT/EP2019/079468, filed Oct. 29, 2019, designating the United States and claiming priority to U.S. Provisional Application No. 62/752,789, filed on Oct. 30, 2018. The above identified applications are incorporated by reference.

TECHNICAL FIELD

This disclosure relates to video encoding and/or decoding.

BACKGROUND

This disclosure relates to the encoding and/or decoding of a video sequence, which consists of a series of images (a.k.a., pictures).

Each image of the video sequence consists of one or more components. Each component can be described as a two-dimensional rectangular array of sample values. It is common that an image in a video sequence consists of three components: one luma component Y where the sample values are luma values, a first chroma component Cb where the sample values are chroma values, and a second chroma component Cr where the sample values are chroma values. Other examples include Y' Cb Cr, Yuv and ICTCP. In ICTCP, I is the "intensity luma" component. For the remainder of this document we will refer to any luma component Y', Y or I as Y or simply luma.

It is common that the dimensions of the chroma components are smaller than the luma components by a factor of two in each dimension. For example, the size of the luma component of a High-Definition (HD) image would be 1920×1080 and the chroma components would each have the dimension of 960×540. Components are sometimes referred to as color components.

In video coding, each component is split into blocks and the coded video bitstream is a series of blocks. A block is one two-dimensional array of samples. It is common in video coding that the image is split into units that cover a specific area of the image. Each unit consist of all blocks from all components that make up that specific area and each block belongs fully to one unit. The macroblock in H.264 and the Coding unit (CU) in HEVC are examples of units.

In HEVC, each picture is partitioned into coding tree units (CTU). A CTU consist of an N×N block of luma samples and two M×M corresponding chroma blocks. A CTU in HEVC is like a macroblock in H.264 and earlier standards, but, in contrast to macroblocks, the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU).

A CU in HEVC always consist of a luma block with equal height and width. How each CTU is split is conveyed in the bitstream. The CU is further the root node of two other trees, the prediction tree that has got prediction units (PUs) as nodes and the transform tree that has got transform units (TUs) as nodes. Some decoding processes in HEVC are done on the CU level, some are done on the PU level and some are done on the TU level. Boundaries between PUs and boundaries between TUs are filtered by a deblocking filter to reduce discontinuities between TUs and PUs.

In HEVC there exist two kinds of prediction types for a PU, intra prediction which only uses prediction from previously decoded samples of the current picture for prediction, and inter prediction which uses prediction form at least one previously decoded picture.

In HEVC, deblocking is first applied on vertical boundaries and then on horizontal boundaries. The boundaries are either TU boundaries or PU boundaries. To enable parallel friendly deblocking (PFDB), the deblocking is performed on an 8×8 sample grid.

A deblocking filter strength parameter (bs) is set for each boundary. If the value of bs is larger than 0, then deblocking may be applied. The larger the boundary strength is, the stronger filtering is applied. First it is checked if any of the blocks at a PU boundary between the blocks is an intra predicted block then bs is set to=2, or if both blocks use inter prediction but and they use different reference frames or have significantly different motion vectors then bs is set to =1. It is also checked if a TU boundary between the blocks has non-zero transform coefficients in at least one of the blocks (code block flag CBF equal to 1), then bs is set to =1. This first checks sets a boundary strength (bs) which is larger than 0 to indicate that deblocking should be applied. The larger the boundary strength is the stronger filtering is applied. To reduce/avoid removing natural structures when deblocking, a check that there are not any natural structures on respective sides of the boundary is then applied for luma. In HEVC, gradient calculations are used on respective sides of the boundary using the following inequality: abs(p0-2*p1+p2)+abs(q0-2*q1+q2)<beta, where beta is a parameter based on the quantization parameter for the block and p0, p1, to p2 are three consecutive samples on one side of the block boundary and q0, q1, to q2 are three consecutive samples on the other side of the block boundary. The condition is checked at two positions along the boundary, and if both conditions are fulfilled, then the luma samples are deblocked for that 4 sample part of the boundary. Chroma boundaries may always be filtered if one any of the neighboring blocks are intra coded.

In the current draft of the specification for H.266 (VVC draft 3 JVET-L1001) a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree as in HEVC. However, a CU in VVC can implicitly be divided into multiple TUs. Implicit TUs can however only appear when the CU size has a width or height larger than the maximum transform size. If that is not the case, the CU does not have any prediction tree nor transform tree.

In VVC, deblocking is first applied on vertical CU boundaries and vertical implicit TU boundaries and vertical sub-block boundaries then on horizontal CU boundaries and horizontal implicit TU boundaries and horizontal sub-block boundaries. The deblocking is based on HEVC deblocking.

In VVC two sub-block prediction tools are included: AFFINE and ATMVP. A sub-block prediction tool can be characterized as a prediction tool that has more than one set of motion parameters for different parts of a block, e.g. sub-blocks. AFFINE operates on sub-block size 4×4 and ATMVP on sub-block size 8×8. Each sub-block is predicted by specific motion parameters such as at least one motion vector and one indicator of reference frame to predict from. When a CU uses sub-block motion compensation like ATMVP and AFFINE, sub-block boundaries can be created inside CU due to different motion parameters are used in at least some of the sub-blocks. In VVC (JVET-L1001) from Macau, in addition to deblock CU and implicit TU boundaries on 8×8 grid also sub-block boundaries are deblocked on 8×8 grid when motion parameters on respective side of a sub-block boundary differs sufficiently. Both CU, implicit TU and sub-block boundaries can be deblocked in parallel since deblocking is based on HEVC luma deblocking that reads at most 4 samples and write of at most 3 samples, on each side of the boundary, which is sufficient for when deblocking on an 8×8 grid.

FIG. 1 shows an example of a vertical sub-block boundary 102 from ATMVP which is 8 samples from a vertical implicit TU boundary 101. FIG. 2 shows another example of a vertical sub-block boundary 202 that is 8 samples from a CU boundary 201. As shown in FIG. 2, the vertical block boundary 201 is located between the P block and the Q block, which together form a unit, and the Q block has within it a number of vertical sub-block boundaries, including sub-block boundary 202 which is closest to boundary 201 and not coincident with boundary 201. FIG. 3 illustrates an example row from the unit shown in FIG. 2. As shown in FIG. 3, the example row from the Q block includes a set of samples (a.k.a., pixel values) (samples q0 to q7 are shown) and the example row from the P block includes a set of samples (samples p0 to p7 are shown). The q samples (q0-q7) are positioned orthogonal to the block boundary 201. Likewise, p samples (p0-p7) are positioned orthogonal to the block boundary 201.

1. Deblocking Using Long Filters

Deblocking using longer filters, currently in core experiment on deblocking (JVET-L1031-v2), are typically applied for large blocks when at least the length orthogonal to the block boundary of the block on both sides are equal to or larger than 32 or equal to or larger than 16. There also exist cases where a longer filter is used on a side is equal to or larger than 32 and a shorter filter is used on the other side if that is smaller than 32.

One example of 8×8 grid luma deblocking using long filters from JVET-L1031-v2.

CE11.1.9 JVET-L0072

HEVC deblocking filters are extended with longer deblocking filters for luma. One of 7 and 5 sample filtering on respective side of the block boundary can be applied for a 16-sample segment of the block boundary if current and neighboring block size >=32 and >=16 respectively and corresponding conditions for 8 lines of the boundary are fulfilled as shown in Table 1 below.

TABLE 1

| Size | Conditions for each of the 8 lines of a 16 sample segment (line 0, 3, 4, 7, 8, 11, 12, 15) |
|---|---|
| 7 | $HEVC_{strong\_weak}$ && $\left(\|p_0 - 2*p_2 + p_4\| + \|q_0 - 2*q_2 + q_4\| < \frac{3*\beta}{32}\right)$ && |

TABLE 1-continued

| Size | Conditions for each of the 8 lines of a 16 sample segment (line 0, 3, 4, 7, 8, 11, 12, 15) |
|---|---|
| | $\left(\|p_0 - p_2 - p_3 + p_5\| + \|q_0 - q_2 - q_3 + q_5\| < \frac{3*\beta}{32}\right)$ && |
| | $\left(\|p_0 - 2*p_3 + p_6\| + \|q_0 - 2*q_3 + q_6\| < \frac{3*\beta}{32}\right)$ && |
| | $\left(\|p_0 - p_3 - p_4 + p_7\| + \|q_0 - q_3 - q_4 + q_7\| < \frac{3*\beta}{32}\right)$ |
| 5 | $HEVC_{strong\_weak}$ && $\left(\|p_0 - p_4\| + \|q_0 - q_4\| < \frac{\beta}{8}\right)$ && |
| | $\left(\|p_0 - p_5\| + \|q_0 - q_5\| < \frac{\beta}{8}\right)$ |
| 0-3 | HEVC filter and decisions |

Block boundary samples $p_i$ and $q_i$ for i=0 to S-1 are then replaced by linear interpolation as follows:

$p_i' = (f_i * Middle_s + (64-f_i) * P_s + 32) >> 6$, clipped to $p_i \pm tc$ $q_i' = (f_i * Middle_s + (64-f_i) * Q_s + 32) >> 6$, clipped to $q_i \pm tc$ where f, Middle, P and Q are given in Table 2 below:

TABLE 2

| S | Filter kernels |
|---|---|
| 7 | $f_i = 59 - i * 9$, can also be described as f = {59, 50, 41, 32, 23, 14, 5} <br> $Middle_7 = (2 * (p_o + q_o) + p_1 + q_1 + p_2 + q_2 + p_3 + q_3 + p_4 + q_4 + p_5 + q_5 + p_6 + q_6 + 8) >> 4$ <br> $P_7 = (p_6 + p_7 + 1) >> 1, Q_7 = (q_6 + q_7 + 1) >> 1$ |
| 5 | $f_i = 58 - i * 13$, can also be described as f = {58, 45, 32, 19, 6} <br> $Middle_5 = (2 * (p_o + q_o + p_1 + q_1 + p_2 + q_2) + p_3 + q_3 + p_4 + q_4 + 8) >> 4$ $P5 = (p_4 + p_5 + 1) >> 1, Q_5 = (q_4 + q_5 + 1) >> 1$ |

Use HEVC luma filter and decisions with following modifications for chroma deblocking filtering.

Determine the number of samples to modify in block P and Q as follows:
  lengthP=edge==EDGE_HOR?
    (CUP_height_chroma>>2): (CUP_width_chroma>>2)
  lengthQ=edge==EDGE_HOR?
    (CUQ_height_chroma>>2):
    (CUQ_width_chroma>>2)

Only filter boundary if both lengthQ and lengthP is larger than 0.

The HEVC strong filter (reading 4 samples and modifying 3 samples on respective side) is only applied if both sides have a maximum deblocking filter length larger than 2.

Strong/weak filter and number of samples to filter is determined for each line. Inter blocks are only filtered if Laplacian gradients near the boundary on respective side is below the structure threshold "beta" but for intra blocks that check is by passed.

"beta" parameter is divided by 8 compared to what is used for luma.

2. 4×4 Grid Luma Deblocking

In this case there is one core experiment (JVET-L1031-v2) on restricting deblocking on CU boundaries that has at least one side (orthogonal to the block boundary) equal to 4 to only filter one sample on each side of the block boundary.

One alternative solution is to do deblocking on 4×4 grid but not if any of the sides is 4. Both approaches allow for parallel friendly processing on 4×4 grid.

One example regarding deblocking on 4×4 grid from JVET-L1031-v2

CE11.2.1 Combination of JVET-L0073, JVET-L0225, and JVET-L0170

In current VVC software large rectangular blocks of size N×8 and N×4 are not deblocked where N can be up to 64. This test applies deblocking on 4×4 grid to allow for deblocking of N×4 blocks aligned with the current 8×8 grid but also for N×8 blocks that are not aligned with the current grid. The number of samples to read and modify is limited to allow for parallel friendly processing. If at least one side of the block boundary has a length orthogonal to the block boundary equal to 4 only use the weak filter. Furthermore, only one sample is filtered on each side of the block boundary in this case.

SUMMARY

Certain challenges currently exist. For example, with respect to 8×8 grid luma deblocking, combining: i) deblocking with longer luma filter that reads 8 samples and modifies 7 samples on a respective side of a CU boundary with ii) sub-block deblocking that reads 4 samples and modifies 3 samples on respective side of a sub-block boundary can result in dependency between filtering on CU and sub-block boundaries.

With respect to 4×4 grid luma deblocking, like 8×8 luma deblocking, a dependency between deblocking with long filters and sub-block deblocking may result. In this case there can also be a dependency between deblocking on CU boundaries when modifying more than one pixel if the adjacent block uses sub-blocks and 4×4 grid deblocking is applied for sub-blocks.

To address these challenges, this disclosure describes various deblocking embodiments. For example, the embodiments enable deblocking of sub-block boundaries that do not coincide with block boundary from blocks that use sub-block prediction tool while enabling use of longer deblocking filters on block boundaries that are shared with at least one block that uses sub-block prediction tool.

In a first aspect, there is a method for deblocking, and in some embodiments the method includes deblocking a block boundary between a first block (B1) (e.g., a P block) and a second block (B2) (e.g., a Q block) with the restriction that not more than 5 samples are modified on the B2 side of the block boundary as a result of the deblocking. The method also includes deblocking a sub-block boundary within the B2 block such that not more than 2 samples on the side of the sub-block boundary within the B2 block that is closest to the block boundary between B1 and B2 are modified by the deblocking. In some embodiments, the deblocking steps are performed in parallel.

This first aspect enables PFDB by restriction on the number of samples to read and modify for sub-block boundaries that do not coincide with the vertical block boundary and boundaries between blocks where at least one block uses a sub-block prediction tool with some compromise on amount of samples that can be modified by deblocking.

In a second aspect, there is a method for deblocking, and in some embodiments the method includes: deblocking a vertical sub-block boundary within a first block (B1) (e.g., a Q block) such that not more than 3 samples on each side of the vertical sub-block boundary within the B1 block are modified by the deblocking; and after deblocking the vertical sub-block boundary within the B1 block, deblocking a vertical block boundary between a second block (B2) (e.g., a P block) and the B1 block.

This second aspect enables PFDB of all sub-blocks and all CU boundaries but sub-block deblocking that do not coincide with CU boundary needs to be performed before deblocking of CU boundaries. This aspect does not need to compromise on the number of samples that can be modified by deblocking.

In a third aspect, there is a method for deblocking, and in some embodiments the method includes: for at least the vertical sub-block boundary within a first block (B1) that is closest to a vertical boundary between block B1 and a second block (B2) but not coincident with this vertical boundary, deblocking the vertical sub-block boundary such that not more than 3 samples on each side of the vertical sub-block boundary are modified as a result of the deblocking; and for at least the horizontal sub-block boundary within block B1 that is closest to the horizontal boundary between B1 and a horizontal neighbor but not coincident with this horizontal boundary, deblocking the horizontal sub-block boundary such that not more than 3 samples on each side of the horizontal sub-block boundary are modified as a result of the deblocking. In this third aspect sub-block boundaries may be deblocked directly after the prediction of a sub-block prediction tool and before the transform instead of after reconstruction as typically is performed. This alternative does not need to compromise on the number of samples that can be modified by deblocking.

In a fourth aspect, there is a method for deblocking, and in some embodiments the method includes: deblocking a vertical block boundary between a first block (B1) (e.g., a P block) and a second block (B2) (e.g., a Q block) on a 4×4 grid with the restriction that not more than 1 sample is modified on the B1 side of the vertical block boundary as a result of the deblocking; and deblocking a vertical sub-block boundary within the B2 block on an 8×8 grid from the vertical block boundary such that not more than 3 samples on each side of the vertical sub-block boundary within the B2 block are modified by the deblocking, wherein the width of the block B1 is 4. This fourth aspect enables PFDB on 4×4 grid while keeping 8×8 grid for sub-block boundaries inside the first block (e.g., CU).

In another aspect a computer program is disclosed. The computer program comprises instructions which when executed by processing circuitry causes the processing circuitry to perform any method disclosed herein. In some embodiments, a carrier contains the computer program, wherein the carrier is one of an electronic signal, an optical signal, a radio signal, and a computer readable storage medium.

In another aspect an apparatus is disclosed. The apparatus is adapted to deblock a block boundary between a first block, B1, and a second block, B2, with the restriction that not more than 5 samples are modified on the B2 side of the block boundary as a result of the deblocking; and deblock a sub-block boundary within the B2 block such that not more than 2 samples on the side of the sub-block boundary within the B2 block that is closest to the block boundary between B1 and B2 are modified by the deblocking.

In another aspect there is disclosed an apparatus that includes processing circuitry; and a memory. The memory contains instructions executable by said processing circuitry, whereby said apparatus is operative to: deblock a block boundary between a first block, B1, and a second block, B2, with the restriction that not more than 5 samples are modified on the B2 side of the block boundary as a result of the deblocking; and deblock a sub-block boundary within the B2 block such that not more than 2 samples on the side of the sub-block boundary within the B2 block that is closest to the block boundary between B1 and B2 are modified by the deblocking.

BRIEF DESCRIPTION OF THE DRAWINGS

The accompanying drawings, which are incorporated herein and form part of the specification, illustrate various embodiments.

DETAILED DESCRIPTION

Figure 1:
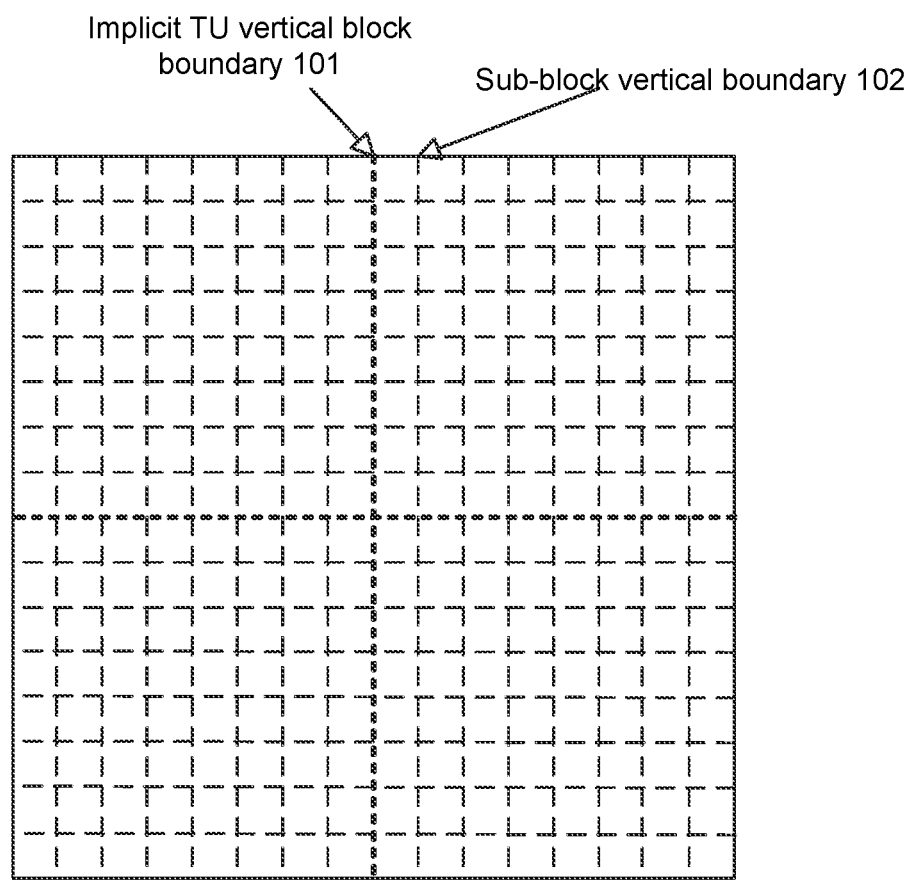
FIG. 1 shows an example of a vertical block boundary and a vertical sub-block boundary.
Figure 2:
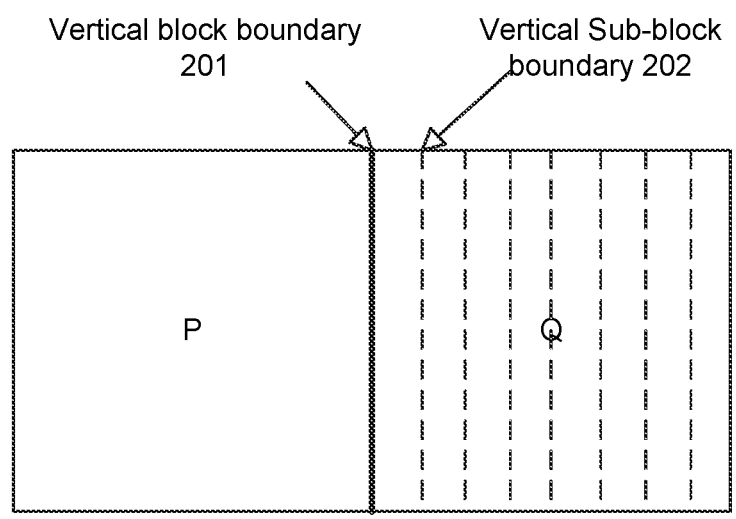
FIG. 2 shows another example of a vertical block boundary and a vertical sub-block boundary.
Figure 3:
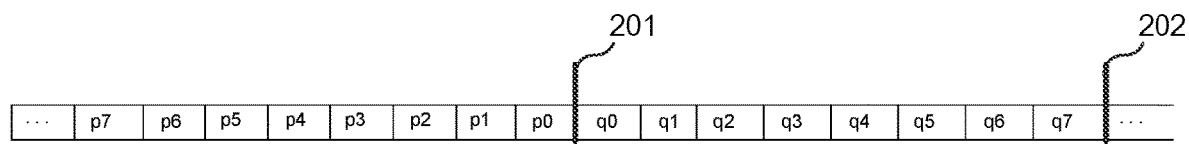
FIG. 3. illustrates a first set of samples on one side of a vertical block boundary and a corresponding second set of samples on the other side of the vertical block boundary.
Figure 4:
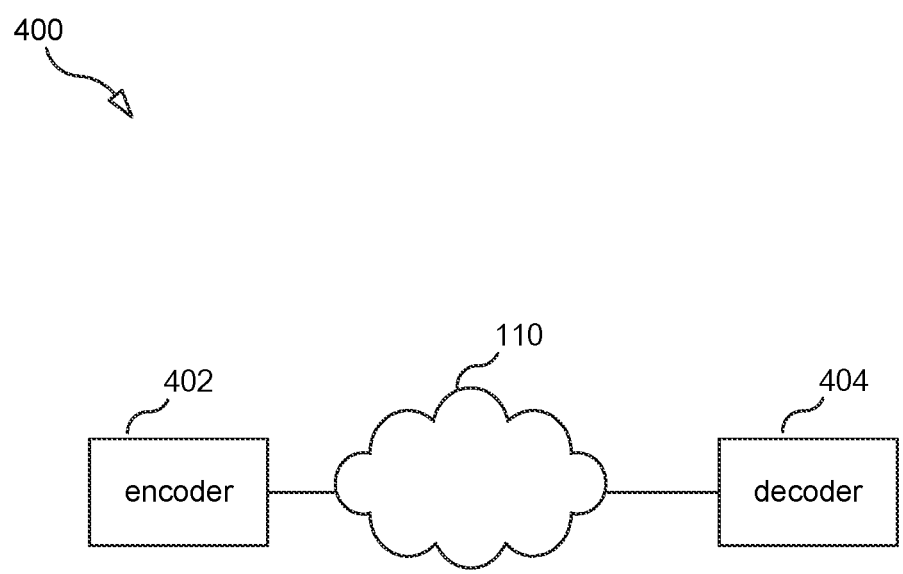
FIG. 4 illustrates a system comprising an encoder and a decoder.

FIG. 4 illustrates a system 400 according to an example embodiment. System 400 includes an encoder 402 in communication with a decoder 404 via a network 110 (e.g., the Internet or other network). Deblocking may be performed in both encoder 402 and decoder 404.

Figure 5:
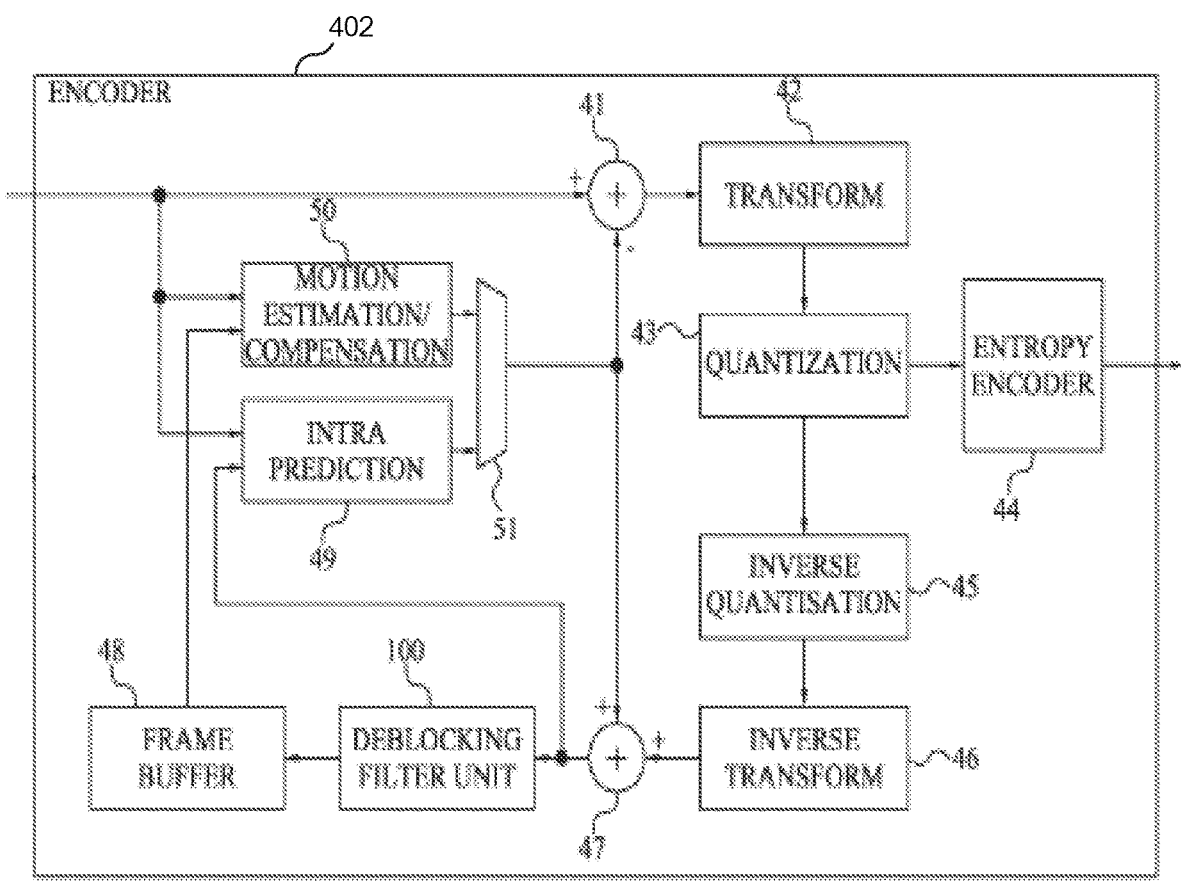
FIG. 5 illustrates an example encoder.

FIG. 5 is a schematic block diagram of encoder 402 for encoding a block of pixels in a video frame of a video sequence according to an embodiment. A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50 for outputting an inter prediction of the block of pixels. An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction. The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels. The transformed and quantized residual error for the current block of pixels is also provided to an inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a deblocking filter unit 100 according to the embodiments in order to perform deblocking filtering to combat any blocking artifact. The processed new reference block is then temporarily stored in a frame buffer 48, where it is available to the intra predictor 49 and the motion estimator/compensator 50.

Figure 6:
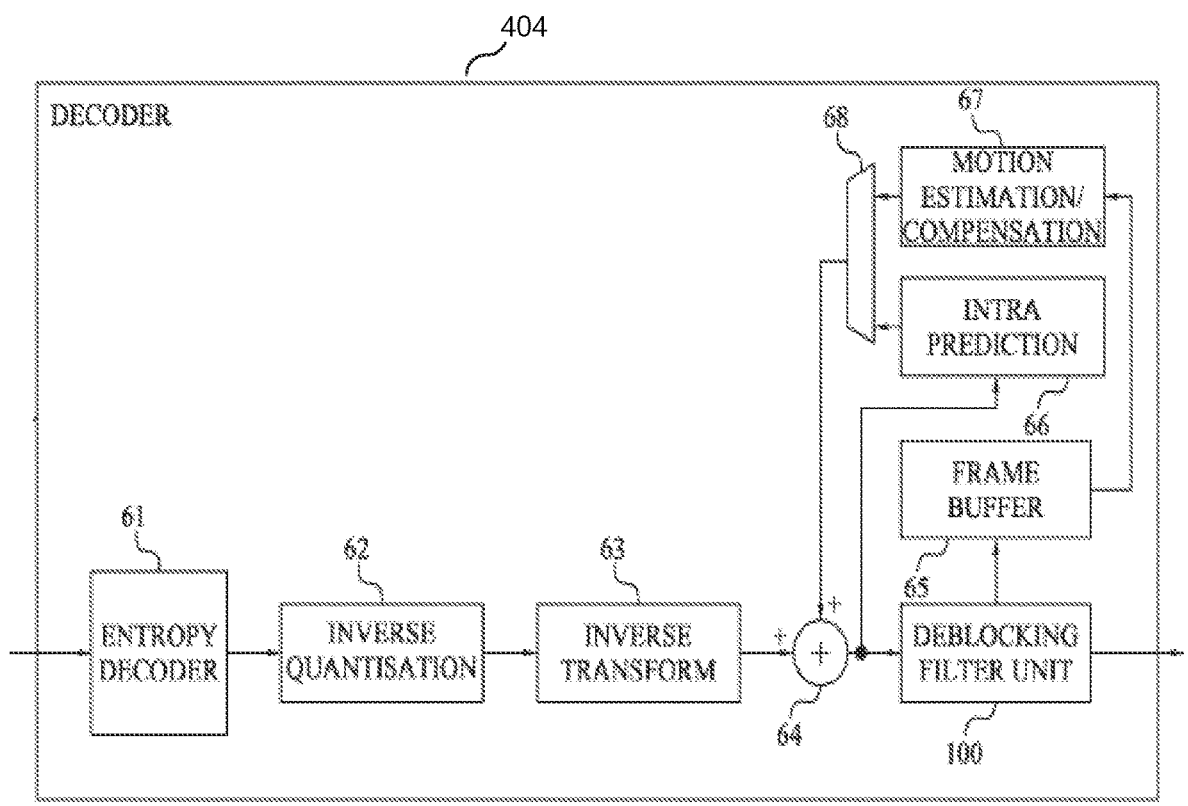
FIG. 6 illustrates an example decoder.

FIG. 6 is a corresponding schematic block diagram of decoder 402 according to some embodiments. The decoder 60 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors. These residual errors are added in an adder 64 to the pixel values of a reference block of pixels. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of pixels output form the adder 64 is input to a deblocking filter unit 100 according to the embodiments in order to deblocking filter any blocking artifacts. The filtered block of pixels is output form the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67. The output from the adder 64 is preferably also input to the intra predictor 66 to be used as an unfiltered reference block of pixels.

The text below describes deblocking of vertical boundaries, but the same principles apply to horizontal boundaries.

The interaction between luma deblocking on vertical block boundaries (CU/TU and implicit TU boundaries) with deblocking on vertical sub-block boundaries can be dealt with in following ways.

Alternative 1

In a first alternative, a) the number of samples modified by deblocking on at least the vertical sub-block boundary that is closest to the vertical block boundary but that does not coincide with the vertical block boundary is restricted and/or b) the number of samples modified by deblocking at least on the side of a vertical block boundary which is shared with a block that uses a sub-block prediction tool is restricted. Alternative 1 is parallel friendly and all boundaries are deblocked with more emphasis on vertical CU and large TU (implicit TU) boundaries, e.g. more samples read and modified for those boundaries than for vertical sub-block boundaries that do not coincide with the vertical block boundary. Below is illustrated an example showing which samples are modified on a vertical CU boundary and which are modified on vertical sub-block boundary that does not coincide with the vertical block boundary when deblocking sub-block boundaries on an 8×8 grid that also enables parallel deblocking of boundaries:

---
r w w | w w r s s s s s || s s s s s r w w | w w r,
--- where r represents the samples that are read by deblocking, w represents the samples read and modified by sub-block deblocking, s represents the samples read and modified by deblocking at CU boundary, || denotes the CU boundary, and | denotes the sub-block boundary.

Alternative 2

For a block that uses a sub-block prediction tool, a vertical sub-block boundary that does not coincide with the vertical block boundary is deblocked before the vertical block boundary is deblocked. Alternative 2 is parallel friendly for all vertical sub-block boundaries and for all vertical CU boundaries but adds a sequential dependency in that vertical sub-block boundaries that do not coincide with the vertical CU boundary need to be filtered before vertical CU boundaries. With alternative 2, there is no compromise on the use of longer filters on vertical CU boundaries and no compromise on deblocking of vertical sub-block boundaries that do not coincide with the vertical block boundary.

Alternative 3

For a prediction block that uses a sub-block prediction tool, the vertical sub-block boundaries of the prediction block that do not coincide with a vertical block boundary of the prediction block are deblocked prior to transformation. Accordingly, there is no need for deblocking of such vertical sub-block boundaries that do not coincide with the vertical block boundary after blocks have been reconstructed since the vertical sub-block boundaries have already been taken care of in the prediction stage. A benefit of this is that residual spent on block artifacts is reduced, and there is no compromise on use of longer filters on CU and implicit TU boundary.

Alternative 4

Deblock vertical sub-block boundaries that do not coincide with the vertical block boundary on a different grid than block boundaries. Deblock vertical CU boundaries on 4×4 grid but deblock vertical sub-block that do not coincide with the vertical CU boundary on 8×8 grid relatively to the 4×4 grid. This enables parallel friendly deblocking of CUs on 4×4 grid at the same time as sub-block boundaries inside the CU can be deblocked on 8×8 grid.

EXAMPLES

Below CE11.1.9 and CE11.2.1 are used as examples of long filtering and 4×4 grid deblocking respectively. But these are merely examples. It can be other variants of long filters as well as other variants of 4×4 grid deblocking. The important aspect is the interaction between deblocking of block boundaries (e.g., CU/TU) and deblocking of sub-block boundaries that do not coincide with block boundaries for blocks that use a sub-block prediction tool. ATMVP and AFFINE are used as examples of sub-block prediction tools. Other sub-block prediction tools can also be processed similarly. One approach is to handle all sub-blocks in the same way. In that way it is not needed any specific standardization text for individual sub-block tools and also all blocks with sub-blocks can be handled in the same way. Another approach if deblocking is not applied for all sub-block prediction tools is to check for the specific sub-block prediction tools which deblocking are applied for and only apply deblocking for those cases.

Below we indicate a sub-block coding mode as MODESUBBLOCK, modeP is the coding mode of block P and modeQ is the coding mode of block Q where block Q is the current block to be deblocked.

Example Embodiment of Alternative 1 on Top of CE11.1.9

The restriction on filtering on vertical CU, vertical implicit TU and vertical sub-block boundaries can be as follows when at least one a block uses a sub-block prediction tool:

---
If (modeP== MODESUBBLOCK OR modeQ== MODESUBBLOCK)
{
  S=5 for vertical CU boundary (restrict filtering to 5+5)
}
If (modeQ == MODESUBBLOCK)
{
  S=5 for vertical implicit TU boundary (restrict filtering to 5+5)
  S=2 for other vertical boundaries
  (restrict filtering to weak filtering 2+2)
}
---

Below it is illustrated which samples that can be modified on vertical CU boundary and which can be modified on vertical sub-block boundary when deblocking vertical sub-block boundaries on an 8×8 grid that also enables parallel deblocking of boundaries. Same example can be applied for implicit TU where CU boundary in the illustration is replaced an implicit TU boundary.

---
r s s s s s || s s s s s r w w | w w r
--- where r represents the samples that are read by deblocking, w represents the samples read and modified by sub-block deblocking, s represents the samples read and modified by deblocking at CU boundary, || denotes the CU boundary, and | denotes the sub-block boundary.

One example embodiment related to chroma deblocking:

---
If(modeQ == MODESUBBLOCK)
{
  S=1 for vertical sub-block boundaries
  (restrict filtering to weak filtering 1+1)
}
---

Example Embodiment of Alternative 2 on Top of CE11.1.9

If a sub-block prediction tool (modeP==MODESUBBLOCK) is used in block P, vertical sub-block boundaries that do not coincide with the vertical block boundary in block P are deblocked and if a sub-block prediction tool is used in block Q (modeQ==MODESUBBLOCK), vertical sub-block boundaries that do not coincide with the vertical block boundary in block Q are deblocked, before vertical CU and vertical TU boundaries in block Q are deblocked.

Example Embodiment of Alternative 3

In case current block uses coding mode MODESUB-BLOCK it is checked if motion parameters on respective side of at least one vertical sub-block boundary that do not coincide with the vertical block boundary inside the current block differs sufficiently and if so deploy filtering to reduce discontinuity between the predicted sub-blocks. The state of the art deblocking process including deblocking decision and deblocking filtering could be used to produce a smooth transition from one side of the vertical sub-block boundary to the other side of the vertical sub-block boundary.

```
If(mode == MODESUBBLOCK)
{
Apply deblocking on 8×8 grid, where the 8×8 grid is aligned with the vertical block border,
and filtering at most 3 samples and reading at most 4 samples on respective side of at least one
vertical sub-block boundary inside the block that do not coincide with the vertical block
boundary.
}
```

This embodiment could also be used together with 4×4 grid deblocking as follows:

```
If(mode == MODESUBBLOCK)
{
Apply deblocking on 4×4 grid, where the 4×4 grid is aligned with the vertical block border,
and filtering at most 1 samples and reading at most 3 samples on respective side of at least one
vertical sub-block boundary inside the block that do not coincide with the vertical block
boundary.
}
```

Example Embodiment of Alternative 4 on Top of CE11.2.1

Use 4×4 grid for deblocking of vertical CU with restriction of only one pixel can be filtered on each side when one side is 4. Deblocking vertical sub-block boundaries that do not coincide with the vertical block boundary inside a CU on 8×8 grid. Where the 8×8 grid is relatively to the position of the vertical CU boundary for the CU that uses the sub-block prediction tool.

Example Embodiment of Alternative 4 on Top of CE11.2.2

Figure 7:
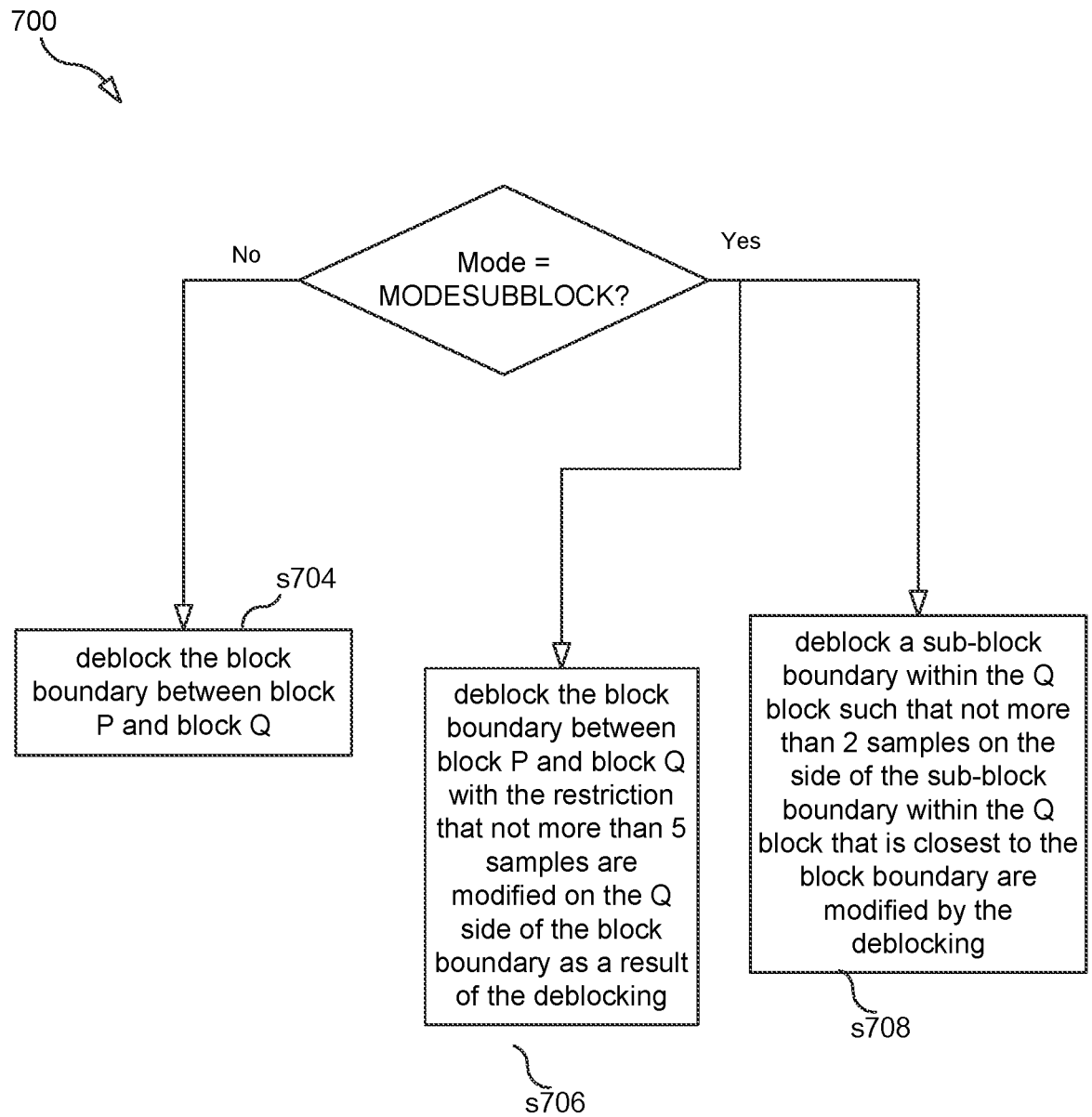
FIG. 7 is a flow chart illustrating a process according to an embodiment.

Use 4×4 grid for deblocking of vertical CU boundaries but do not filter when one side is 4 as in CE11.2.2. Deblocking vertical sub-block boundaries that do not coincide with the vertical block boundary inside a CU on 8×8 grid. Where the 8×8 grid is relatively to the position of the vertical CU boundary for the CU that uses the sub-block prediction tool FIG. 7 is a flow chart illustrating a deblocking process 700 according to one embodiment for implementing the first alternative described above. Process 700 may begin in step s702.

In step s702 the encoder/decoder determines whether sub-block deblocking is activated (e.g., whether a mode is set to MODESUBBLOCK). If the mode is not set to MODESUBBLOCK, then the encoder/decoder performs step s704 in which the encoder/decoder deblocks a block boundary between block P and block Q. This block boundary may be a vertical or horizontal block boundary. Additionally, in some embodiments the block boundary is a transform boundary or a prediction boundary. The deblocking occurring in step s704 may modify more than 5 samples on the Q side of the boundary and may modify more than 5 samples on the P side of the boundary. In some embodiments, determining that sub-block deblocking is activated comprises determining that block B2 has prediction sub-blocks.

If, however, sub-block deblocking is determined to be activated (e.g., the mode is set to MODESUBBLOCK), then the encoder/decoder performs step s706 and s708. In some embodiments, steps s706 and s708 are performed in parallel.

In step s706, the encoder/decoder deblocks the block boundary between block P and block Q with the restriction that not more than 5 samples are modified on the Q side of the block boundary as a result of the deblocking. With respect to the P side of the block boundary it may be the case that more than 5 samples are modified (e.g., 7 samples may be modified on the P side) as a result of the deblocking.

In some embodiments, deblocking the block boundary between block P and block Q comprises modifying a first set of one or more consecutive samples on the Q side of the block boundary that are positioned orthogonal to the block boundary, the first set of samples comprises a first sample (e.g., q0) that is directly adjacent the block boundary, and the deblocking is performed with the restriction that first set of one or more consecutive samples contains not more than the 5 samples (i.e., the set contains at most samples q0, q1 , q2, q3, and q4). In some embodiments, the first set of samples consists of the first sample, a second sample, a third sample, a fourth sample, and a fifth sample, the second sample is directly adjacent the first sample, the third sample is directly adjacent the second sample, the fourth sample is directly adjacent the third sample, the fifth sample is directly adjacent the fourth sample.

In step s708, the encoder/decoder deblocks a sub-block boundary within the Q block (e.g., the sub-block may be an 8×8 sub-block) such that not more than 2 samples on the side of the sub-block boundary within the Q block that is closest to the block boundary between P and Q are modified by the deblocking. This sub-block boundary within the Q block may be 8 samples away from the block boundary between block P and block Q. This restriction of modifying not more than 2 samples on either side of the sub-block boundary may apply to all sub-block boundaries within the Q block that do not coincide with the block boundary between block P and block Q. In some embodiments, the block boundary is a vertical block boundary and the sub-block boundaries are vertical sub-block boundaries. In other embodiments, the block boundary is a horizontal block boundary and the sub-block boundaries are horizontal sub-block boundaries.

In some embodiments, deblocking the sub-block boundary within the Q block comprises modifying a second set of one or more consecutive samples positioned orthogonal to the sub-block boundary, the second set of samples comprises a first sample that is directly adjacent the sub-block boundary, and the deblocking of the sub-block boundary is performed with the restriction that second set of one or more consecutive samples contains not more than the 2 samples. In some embodiments, the second set of samples consists of the first sample that is directly adjacent the sub-block boundary and a second sample directly adjacent said first sample. In some embodiments, the sub-block boundaries are prediction sub-block boundaries.

Figure 8:
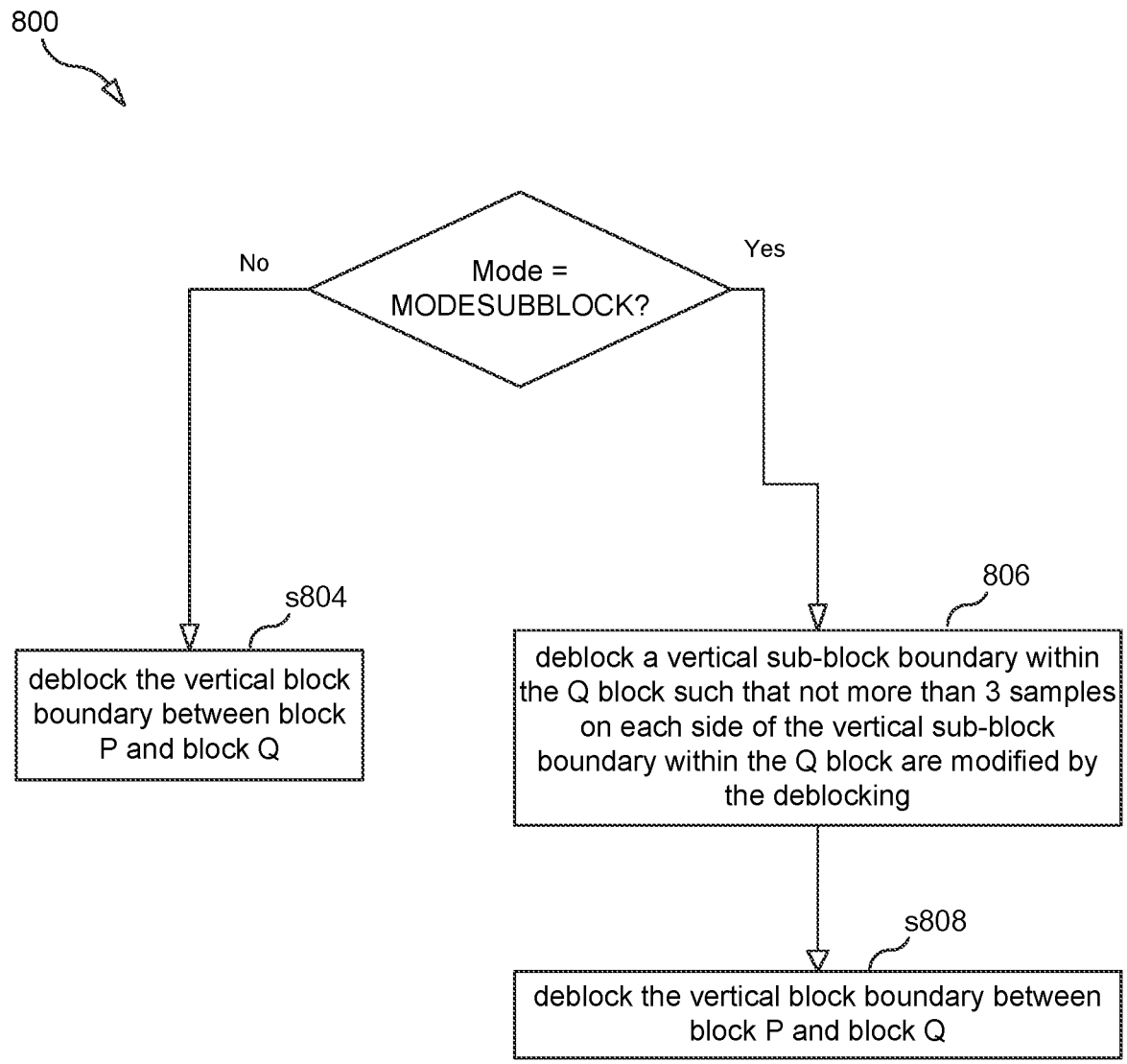
FIG. 8 is a flow chart illustrating a process according to an embodiment.

FIG. 8 is a flow chart illustrating a deblocking process 800 according to one embodiment for implementing the second alternative described above. Process 800 may begin in step s802.

In step s802 the encoder/decoder determines whether a mode is set to MODESUBBLOCK (i.e., whether sub-block deblocking is activated). If the mode is not set to MODESUBBLOCK, then the encoder/decoder performs step s804 in which the encoder/decoder deblocks the vertical block boundary between block P and block Q. The deblocking occurring in step s804 may modify more than 5 samples on the Q side of the vertical boundary and may modify more than 5 samples on the P side of the vertical boundary.

If, however, the mode is set to MODESUBBLOCK, then the encoder/decoder performs step s806 and s808 serially (i.e., step s806 is performed before step s808).

In step s806, the encoder/decoder deblocks a vertical sub-block boundary within the Q block (e.g., the sub-block may be an 8×8 sub-block) such that not more than 3 samples on each side of the vertical sub-block boundary within the Q block are modified by the deblocking. This vertical sub-block boundary within the Q block may be 8 samples away from the vertical block boundary between block P and block Q. This restriction of modifying not more than 3 samples on either side of the vertical sub-block boundary may apply to all vertical sub-block boundaries within the Q block that do not coincide with the vertical block boundary between block P and block Q.

In step s808, which, in this embodiment, is performed after step s806, the encoder/decoder deblocks the vertical block boundary between block P and block Q. In some embodiments, the deblocking in step s808 is performed with the restriction that not more than 5 samples are modified on the Q side of the vertical block boundary as a result of the deblocking. In such an embodiments, with respect to the P side of the vertical block boundary, it may be the case that more than 5 samples are modified (e.g., 7 samples may be modified on the P side) as a result of the deblocking.

In some embodiments, process 800 is modified such that step s806 is performed after step s808.

In some embodiments, for processes 700 and 800, the width of the P block and the width of the Q block are both greater than or equal to 16.

Figure 9:
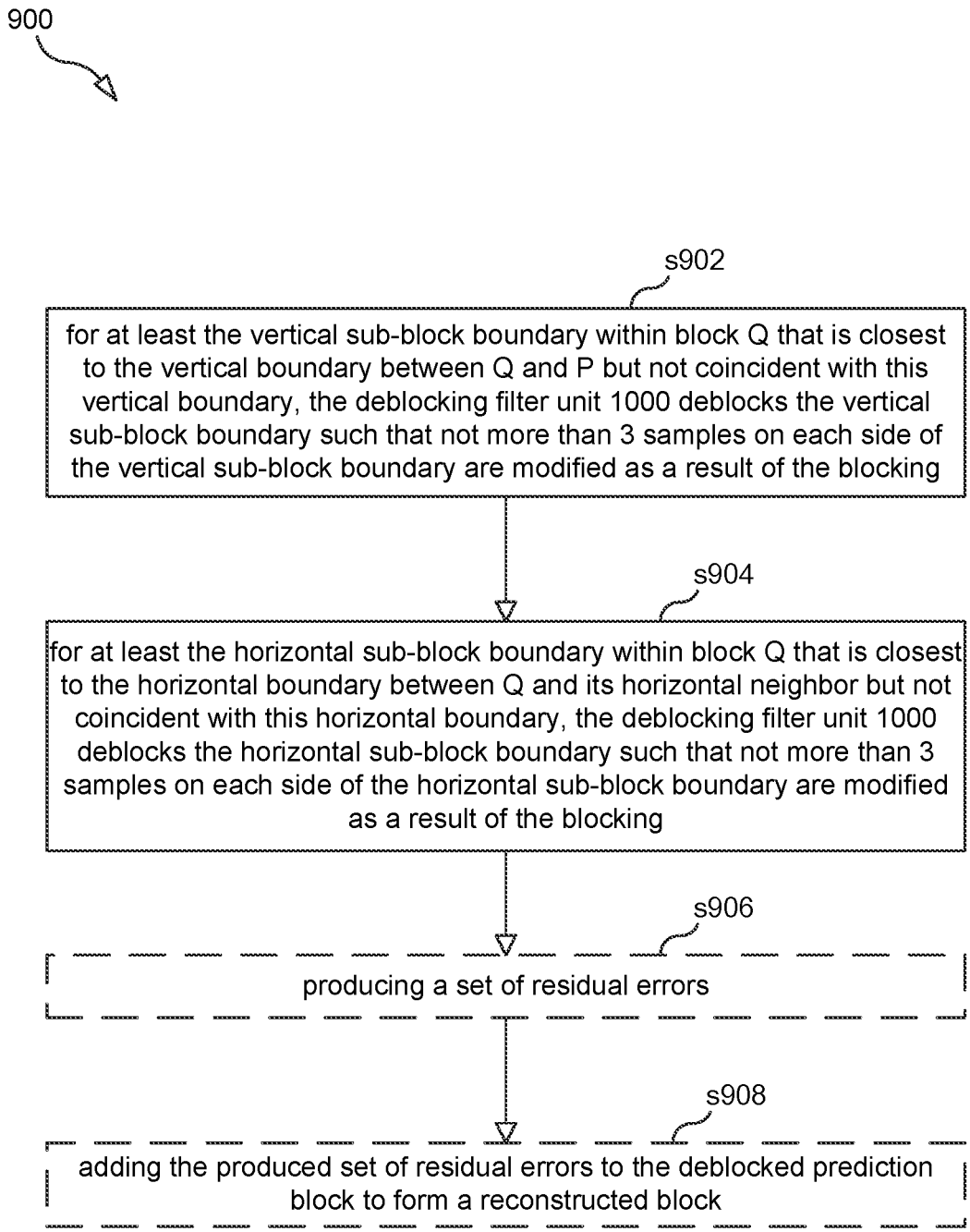
FIG. 9 is a flow chart illustrating a process according to an embodiment.
Figure 10:
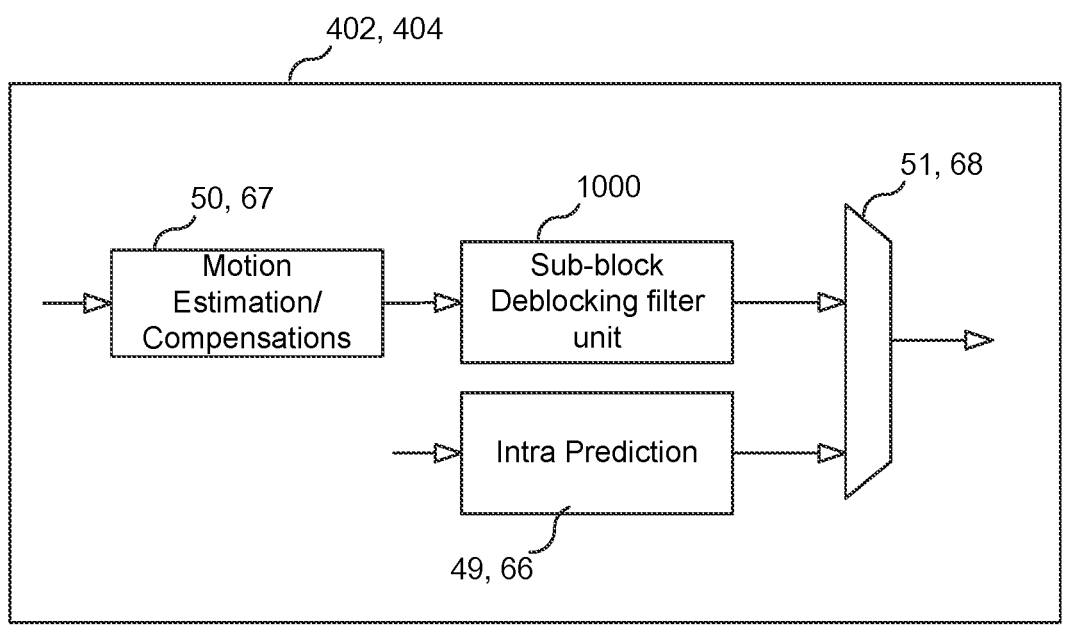
FIG. 10 illustrates the use of a sub-block deblocking filter unit.

FIG. 9 is a flow chart illustrating a deblocking process 900 according to one embodiment for implementing the third alternative described above. Process 900 may be implemented by a sub-block deblocking filter unit 1000 that is positioned between the motion estimator 50, 67 and the selector 51, 68 of the encoder 402 and decoder 404, respectively, as shown in FIG. 10. Process 900 may begin in step s902.

In step s902, for at least the vertical sub-block boundary within block Q that is closest to the vertical boundary between Q and P but not coincident with this vertical boundary, the deblocking filter unit 1000 deblocks the vertical sub-block boundary such that not more than 3 samples on each side of the vertical sub-block boundary are modified as a result of the deblocking. In some embodiments, for all of the vertical sub-block boundaries within block Q that are not coincident with the vertical boundary between Q and P, the deblocking filter unit 1000 deblocks the vertical sub-block boundary such that not more than 3 samples on each side of the vertical sub-block boundary are modified as a result of the deblocking.

In step s904, for at least the horizontal sub-block boundary within block Q that is closest to the horizontal boundary between Q and its horizontal neighbor but not coincident with this horizontal boundary, the deblocking filter unit 1000 deblocks the horizontal sub-block boundary such that not more than 3 samples on each side of the horizontal sub-block boundary are modified as a result of the deblocking. In some embodiments, for all of the horizontal sub-block boundaries within block Q that are not coincident with the horizontal boundary, the deblocking filter unit 1000 deblocks the horizontal sub-block boundary such that not more than 3 samples on each side of the horizontal sub-block boundary are modified as a result of the deblocking.

After performing steps s902 and s904 a deblocked prediction block is formed.

In some embodiments, process 900 further includes producing a set of residual errors (s906) by performing an inverse quantization and inverse transform on quantized and transformed residual errors and then adding the produced set of residual errors to the deblocked prediction block to form a reconstructed block (s908).

Figure 11:
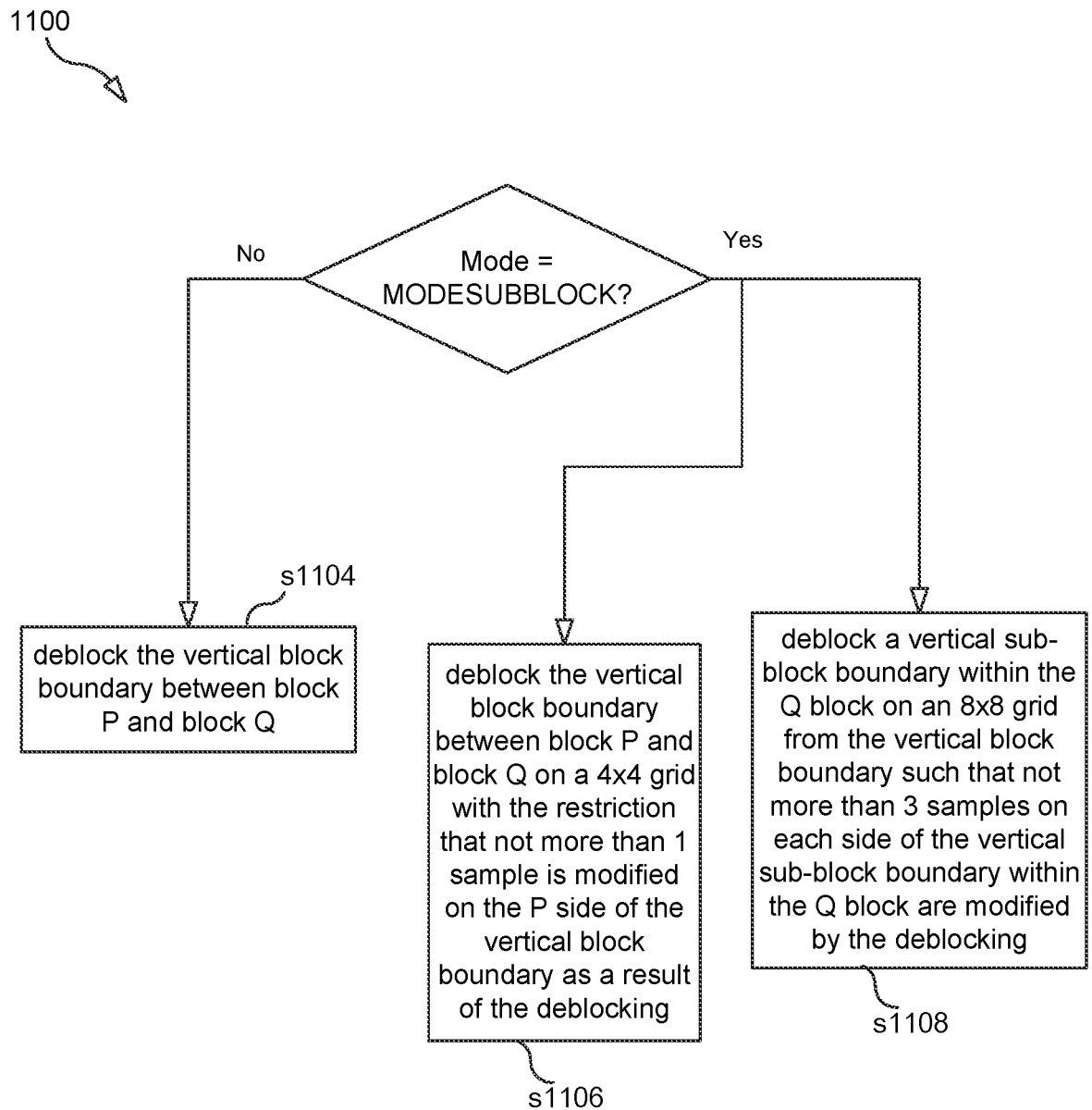
FIG. 11 is a flow chart illustrating a process according to an embodiment.

FIG. 11 is a flow chart illustrating a deblocking process 1100 according to one embodiment for implementing the fourth alternative described above. For process 1100, the width of block P is 4 and the width of block Q is greater than or equal to 16. Process 1100 may begin in step s1102.

In step s1102 the encoder/decoder determines whether a mode is set to MODESUBBLOCK (i.e., whether sub-block deblocking is activated). If the mode is not set to MODESUBBLOCK, then the encoder/decoder performs step s1104 in which the encoder/decoder deblocks the vertical block boundary between block P and block Q. The deblocking occurring in step s1104 may modify more than 1 sample on the P side of the vertical boundary.

If, however, the mode is set to MODESUBBLOCK, then the encoder/decoder performs step s1106 and s1108 in parallel.

In step s1106, the encoder/decoder deblocks the vertical block boundary between block P and block Q on a 4×4 grid with the restriction that not more than 1 sample is modified on the P side of the vertical block boundary as a result of the deblocking. With respect to the Q side of the vertical block boundary it may be the case that more than 1 sample is modified (e.g., 5 or 7 samples may be modified on the Q side) as a result of the deblocking.

In step s1108, the encoder/decoder deblocks a vertical sub-block boundary within the Q block (e.g., the sub-block may be an 8×8 sub-block) on an 8×8 grid from the vertical block boundary such that not more than 3 samples on each side of the vertical sub-block boundary within the Q block are modified by the deblocking. This vertical sub-block boundary within the Q block may be 8 samples away from the vertical block boundary between block P and block Q. This restriction of modifying not more than 3 samples on either side of the vertical sub-block boundary may apply to all vertical sub-block boundaries within the Q block that do not coincide with the vertical block boundary between block P and block Q.

Figure 12:
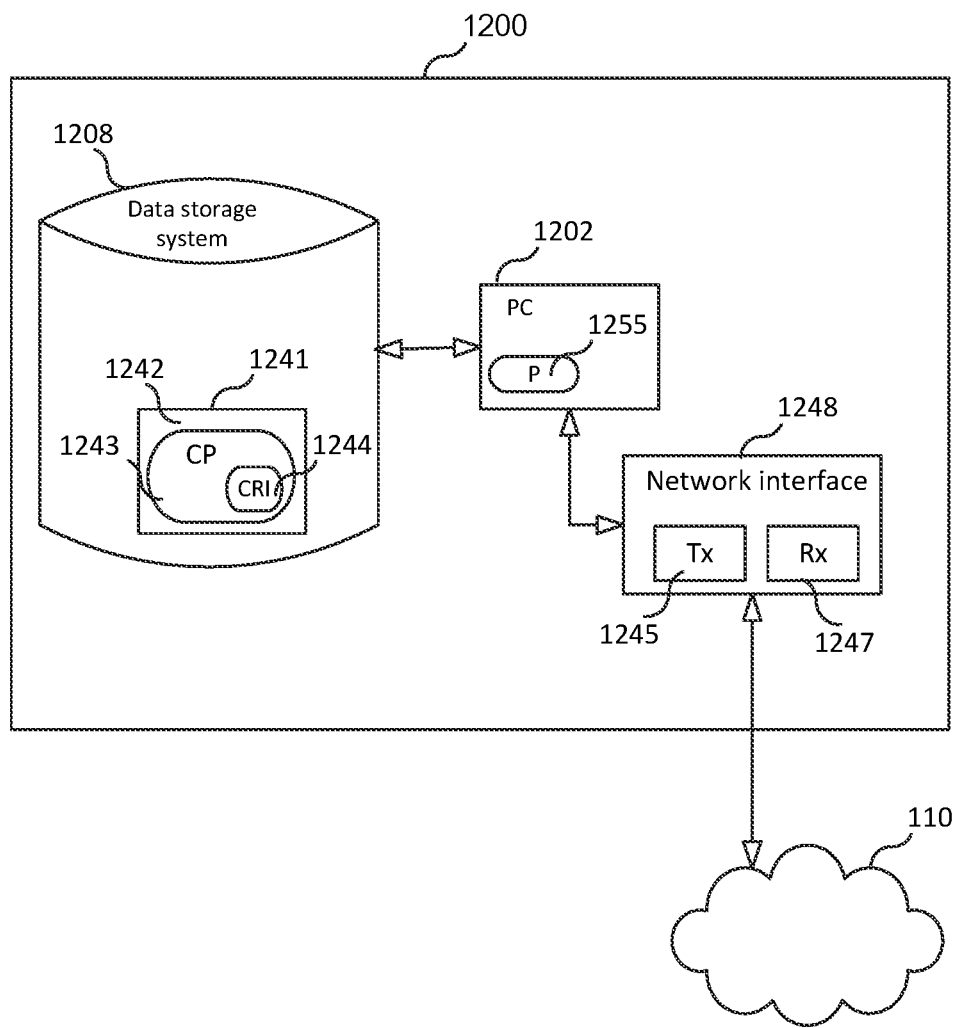
FIG. 12 is a block diagram of an apparatus according to one embodiment.

FIG. 12 is a block diagram of an apparatus 1200 for implementing encoder 402 or decoder 404, according to some embodiments. That is, apparatus 1200 is operative to perform processes described herein. In embodiments where apparatus 1200 implements video encoder 402, apparatus 1200 may be referred to as "encoding apparatus 1200," and in embodiments where apparatus 1200 implements video decoder 404, apparatus 1200 may be referred to as a "decoding apparatus 1200." As shown in FIG. 12, apparatus 1200 may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 1248 comprising a transmitter (Tx) 1245 and a receiver (Rx) 1247 for enabling apparatus 1200 to transmit data to and receive data from other nodes connected to network 120 (e.g., an Internet Protocol (IP) network) to which network interface 1248 is connected; and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes apparatus 1200 to perform steps described herein (e.g., steps described herein with reference to the flow charts). In other embodiments, apparatus 1200 may be configured to perform steps described herein without the need for code. That is, for example, PC 1202 may consist merely of one or more ASICs. Hence, the features of the embodiments described herein may be implemented in hardware and/or software.

Summary of Various Disclosed Embodiments

A1. A method (700) for deblocking, the method comprising: deblocking (s706) a vertical block boundary between a first block (B1) (e.g., a P block) and a second block (B2) (e.g., a Q block) with the restriction that not more than 5 samples are modified on the B2 side of the vertical block boundary as a result of the deblocking; and deblocking (s708) a vertical sub-block boundary within the B2 block such that not more than 2 samples on the side of the vertical sub-block boundary within the B2 block that is closest to the vertical block boundary between B1 and B2 are modified by the deblocking.

A2. The method of embodiment A1, wherein the deblocking steps are performed in parallel.

B1. A method (800) for deblocking, the method comprising: deblocking (s806) a vertical sub-block boundary within a first block (B1) (e.g., a Q block) such that not more than 3 samples on each side of the vertical sub-block boundary within the B1 block are modified by the deblocking; and after deblocking the vertical sub-block boundary within the B1 block, deblocking (s808) a vertical block boundary between a second block (B2) (e.g., a P block) and the B1 block.

C1. A method (900) for deblocking, the method comprising: for at least the vertical sub-block boundary within a first block (B1) that is closest to a vertical boundary between block B1 and a second block (B2) but not coincident with this vertical boundary, deblocking (s902) the vertical sub-block boundary such that not more than 3 samples on each side of the vertical sub-block boundary are modified as a result of the deblocking; and for at least the horizontal sub-block boundary within block B1 that is closest to the horizontal boundary between B1 and a horizontal neighbor but not coincident with this horizontal boundary, deblocking (s904) the horizontal sub-block boundary such that not more than 3 samples on each side of the horizontal sub-block boundary are modified as a result of the deblocking.

C2. The method of embodiment C1, wherein block B1 is a first prediction block and block B2 is a second prediction block.

C3. The method of embodiment C1 or C2, wherein quantized transform coefficients are inverse quantized and then that is inverse transformed and added to the deblocked prediction block B1 to form a reconstructed block.

D1. A method (1100) for deblocking, the method comprising: deblocking (s1106) a vertical block boundary between a first block (B1) (e.g., a P block) and a second block (B2) (e.g., a Q block) on a 4×4 grid with the restriction that not more than 1 sample is modified on the B1 side of the vertical block boundary as a result of the deblocking; and deblocking (s1108) a vertical sub-block boundary within the B2 block on an 8×8 grid from the vertical block boundary such that not more than 3 samples on each side of the vertical sub-block boundary within the B2 block are modified by the deblocking, wherein the width of the block B1 is 4.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] JVET-L1001 VVC draft.
[2] JVET-L1031 CE11 on deblocking.

The invention claimed is:
1. A method for deblocking, the method comprising:
    deblocking a block boundary between a first block (B1) and a second block (B2) with the restriction that not more than 5 samples are modified on the B2 side of the block boundary as a result of the deblocking;
    deblocking a sub-block boundary within the B2 block such that not more than 2 samples on the side of the sub-block boundary within the B2 block that is closest to the block boundary between B1 and B2 are modified by the deblocking; and prior to performing the deblocking steps, determining that sub-block deblocking is activated, wherein deblocking the block boundary is performed as a result of determining that sub-block deblocking is activated, and determining that sub-block deblocking is activated comprises determining that block B2 has prediction sub-blocks.

2. The method of claim 1, wherein the deblocking steps are performed in parallel.

3. The method of claim 1, wherein
the block boundary is a vertical block boundary and the sub-block boundary is a vertical sub-block boundary, or the block boundary is a horizontal block boundary and the sub-block boundary is a horizontal sub-block boundary.

4. The method of claim 1, wherein the sub-block boundary is separated from the block boundary by 8 samples.

5. The method of claim 1, wherein deblocking the sub-block boundary is performed as a result of determining that sub-block deblocking is activated.

6. The method of claim 1, wherein the sub-block boundary in block B2 is a prediction sub-block boundary.

7. The method of claim 1, wherein the block boundary between block B1 and block B2 is a transform boundary or prediction boundary.

8. The method of claim 1, wherein
deblocking the block boundary comprises modifying a first set of one or more consecutive samples on the B2 side of the block boundary that are positioned orthogonal to the block boundary, the first set of samples comprises a first sample that is directly adjacent the block boundary, and the deblocking is performed with the restriction that first set of one or more consecutive samples contains not more than the 5 samples.

9. The method of claim 8, wherein
the first set of samples consists of the first sample, a second sample, a third sample, a fourth sample, and a fifth sample, and the second sample is directly adjacent the first sample, the third sample is directly adjacent the second sample, the fourth sample is directly adjacent the third sample, the fifth sample is directly adjacent the fourth sample.

10. The method of claim 8, wherein
deblocking the sub-block boundary comprises modifying a second set of one or more consecutive samples positioned orthogonal to the sub-block boundary, the second set of samples comprises a first sample that is directly adjacent the sub-block boundary, and the deblocking of the sub-block boundary is performed with the restriction that second set of one or more consecutive samples contains not more than the 2 samples.

11. The method of claim 10, wherein
the second set of samples consists of the first sample that is directly adjacent the sub-block boundary and a second sample directly adjacent said first sample.

12. The method of claim 1, wherein the sub-block boundary is separated from the block boundary by at least 8 samples.

13. The method of claim 1, wherein deblocking the sub-block boundary is performed prior to deblocking the block boundary as a result of determining that sub-block deblocking is activated.

14. A computer program product comprising a non-transitory computer readable medium storing a computer program comprising instructions which when executed by processing circuitry causes the processing circuitry to perform the method of claim 1.

15. An apparatus, the apparatus comprising:
processing circuitry; and
a memory, said memory containing instructions executable by said processing circuitry, wherein said apparatus is operative to:

deblock a block boundary between a first block, B1, and a second block, B2, with the restriction that not more than 5 samples are modified on the B2 side of the block boundary as a result of the deblocking;

deblock a sub-block boundary within the B2 block such that not more than 2 samples on the side of the sub-block boundary within the B2 block that is closest to the block boundary between B1 and B2 are modified by the deblocking; and prior to performing the deblocking steps, determine that sub-block deblocking is activated, wherein the apparatus is configured to perform the deblocking of the block boundary as a result of determining that sub-block deblocking is activated, and determining that sub-block deblocking is activated comprises determining that block B2 has prediction sub-blocks.

16. The apparatus of claim 15, wherein the apparatus is an encoding apparatus.

17. The apparatus of claim 15, wherein the apparatus is a decoding apparatus.

18. The apparatus of claim 15, wherein the apparatus is configured to perform the deblocking of the sub-block boundary as a result of determining that sub-block deblocking is activated.

19. The apparatus of claim 15, wherein
the sub-block boundary in block B2 is a prediction sub-block boundary, and
the block boundary between block B1 and block B2 is a transform boundary or a prediction boundary.

* * * * *